(12) United States Patent
Hisada et al.

(10) Patent No.: US 8,441,767 B2
(45) Date of Patent: May 14, 2013

(54) OVERCURRENT PROTECTION CIRCUIT

(75) Inventors: Takeyoshi Hisada, Hekinan (JP);
Nobutomo Takagi, Okazaki (JP);
Shigekazu Sugimoto, Takahama (JP);
Fukuo Ishikawa, Kariya (JP)

(73) Assignee: Anden Co., Ltd., Anjo (JP)

( * ) Notice: Subject to any disclaimer, the term of this patent is extended or adjusted under 35 U.S.C. 154(b) by 281 days.

(21) Appl. No.: 13/033,984

(22) Filed: Feb. 24, 2011

(65) Prior Publication Data
US 2011/0216448 A1 Sep. 8, 2011

(30) Foreign Application Priority Data

Mar. 3, 2010 (JP) ................................. 2010-46966

(51) Int. Cl.
*H02H 3/08* (2006.01)
*H02H 9/02* (2006.01)

(52) U.S. Cl.
USPC ........................................ 361/93.1; 361/93.7

(58) Field of Classification Search ............. 361/93.1, 361/93.7
See application file for complete search history.

(56) References Cited

U.S. PATENT DOCUMENTS

| | | | |
|---|---|---|---|
| 5,309,312 A * | 5/1994 | Wilkerson et al. | 361/79 |
| 6,768,313 B1 * | 7/2004 | Hamai et al. | 324/537 |
| 7,079,368 B2 | 7/2006 | Ishikawa et al. | |
| 7,372,211 B2 * | 5/2008 | Honbo | 315/220 |
| 2010/0165521 A1 * | 7/2010 | Changali et al. | 361/42 |
| 2011/0089845 A1 * | 4/2011 | Keh | 315/209 R |

FOREIGN PATENT DOCUMENTS

| | | |
|---|---|---|
| JP | A-58-195423 | 11/1983 |
| JP | A-59-083527 | 5/1984 |
| JP | A-61-285023 | 12/1986 |
| JP | A-07-154917 | 6/1995 |
| JP | A-2009-142146 | 6/2009 |
| JP | A-2009-219286 | 9/2009 |
| JP | A-2010-279158 | 12/2010 |

OTHER PUBLICATIONS

Office Action dated Nov. 6, 2012 issued in corresponding JP application No. 2010-046966 (and English translation).

* cited by examiner

*Primary Examiner* — Dharti Patel
(74) *Attorney, Agent, or Firm* — Posz Law Group, PLC (57) ABSTRACT

An overcurrent protection circuit includes a load driver for driving a load, a controller for turning ON and OFF the load driver, a current sensor for measuring a load current flowing through the load, and an add/subtract circuit for performing both an addition operation and a subtraction operation on a previous calculation result or for performing only the subtraction operation on the previous calculation result so as to produce a present calculation result. The addition operation uses an added value depending on the presently measured current. The subtraction operation uses a subtracted value depending on the presently measured current. The controller turns OFF the load driver, when the present calculation result of the add/subtract circuit exceeds a predetermined determination value.

16 Claims, 7 Drawing Sheets

| DETECTED CURRENT RANGE || ADDED VALUE | SUBTRACTED VALUE |
|---|---|---|---|
| ID | CURRENT (A) | | |
| ID1 ~ | 60 ~ | 36000 | $X^2 \times 10$ |
| ID2~1 | 45 ~ 60 | 20250 | $X^2 \times 10$ |
| ID3~2 | 30 ~ 45 | 9000 | $X^2 \times 10$ |
| ID4~3 | 15 ~ 30 | 2250 | $X^2 \times 10$ |
| ID5~4 | X ~ 15 | $X^2 \times 10$ | $X^2 \times 10$ |
| ID6~5 | Y ~ X | $Y^2 \times 10$ | $X^2 \times 10$ |
| ID7~6 | 5 ~ Y | 250 | $X^2 \times 10$ |
| ID8~7 | 2 ~ 5 | 40 | $X^2 \times 10$ |
| ~ID8 | ~ 2 | 0 | $X^2 \times 10$ |

| TERMINAL | CURRENT THRESHOLD | SETTING 1 (0.5 sq) | SETTING 2 (0.75 sq) | SETTING 3 (0.85 sq) | SETTING 4 (1.25 sq) | FORMULA | SW ALLOWABLE CURRENT |
|---|---|---|---|---|---|---|---|
| ch1 ch2 ch3 ch4 ch5 ch6 | ID1 | 80 A | 80 A | 80 A | 80 A | | |
| | ID2 | 39.6 A | 50.9 A | 59.4 A | 73.5 A | $Z \times \sqrt{32}$ | |
| | ID3 | 28 A | 36 A | 42 A | 52 A | $Z \times \sqrt{16}$ | |
| | ID4 | 19.8 A | 25.5 A | 29.7 A | 36.8 A | $Z \times \sqrt{8}$ | |
| | ID5 | 14 A | 18 A | 21 A | 26 A | $Z \times \sqrt{4}$ | |
| | ID6 | 9.9 A | 12.7 A | 14.8 A | 18.4 A | $Z \times \sqrt{2}$ | |
| | ID7 | 7 A | 9 A | 10.5 A | 13 A | | Z (WIRE ALLOWABLE CURRENT) |
| | ID8 | 6.7 A | 8.6 A | 10 A | 12.4 A | $Z \times 0.95$ | |

FIG. 9

| DETECTED CURRENT (I) | ADDED/SUBTRACTED VALUE ch1, ch2, ch3, ch4, ch5, ch6 |
|---|---|
| $ID1 \leq I$ | 128 |
| $ID2 \leq I < ID1$ | 64 |
| $ID3 \leq I < ID2$ | 32 |
| $ID4 \leq I < ID3$ | 16 |
| $ID5 \leq I < ID4$ | 8 |
| $ID6 \leq I < ID5$ | 4 |
| $ID7 \leq I < ID6$ | 2 |
| $ID8 \leq I < ID7$ | 0 |
| $I < ID8$ | −1 or −2 |

OVERCURRENT PROTECTION CIRCUIT

CROSS REFERENCE TO RELATED APPLICATION

This application is based on and claims priority to Japanese Patent Application No. 2010-46966 filed on Mar. 3, 2010, the contents of which are incorporated herein by reference.

FIELD OF THE INVENTION

The present invention relates to an overcurrent protection circuit, in particular, for protecting a wire connected to a vehicle electrical load from overcurrent.

BACKGROUND OF THE INVENTION

In a power supply device disclosed in JP 2009-142146, the square of the detection value proportional to the value of the current flowing through the semiconductor switch connected to the wire is calculated and the value corresponding to the temperature rise determined from the squared detection value is compared with the abnormal determination value. Then, when the temperature rise value exceeds the abnormal determination value, the semiconductor switch is turned OFF.

In JP 2009-142146, the transient heat flow variation corresponding to the thermal variation in the semiconductor switch is represented as a logical expression, and the logical expression is calculated by digital computation.

However, the above technique disclosed in JP 2009-142146 requires digital circuits for achieving the logical expression. As a result, the protection circuit for the semiconductor switch is complicated in configuration.

SUMMARY OF THE INVENTION

In view of the above, it is an object of the present invention to provide an overcurrent protection circuit having a simple configuration.

According to an aspect of the present invention, an overcurrent protection circuit includes a load driver for driving a load, a controller for turning ON and OFF the load driver in accordance with an input condition, a current sensor for measuring a load current flowing through the load, and an add/subtract circuit for performing an addition operation on a previous calculation result or a subtraction operation on the previous calculation result so as to produce a present calculation result. The addition operation uses a predetermined added value that depends on the presently measured current. The subtraction operation uses a predetermined subtracted value that depends on the presently measured current. The add/subtract circuit performs the addition operation, when the presently measured current is greater than a predetermined current value. The add/subtract circuit performs the subtract operation, when the presently measured current is less than the predetermined current value. The controller turns OFF the load driver, when the present calculation result of the add/subtract circuit exceeds a predetermined determination value.

According to another aspect of the present invention, an overcurrent protection circuit includes a load driver for driving a load, a controller for turning ON and OFF the load driver in accordance with an input condition, a current sensor for measuring a load current flowing through the load, and an add/subtract circuit for performing both an addition operation and a subtraction operation on a previous calculation result or for performing only the subtraction operation on the previous calculation result so as to produce a present calculation result. The addition operation uses an added value that depends on the presently measured current. The subtraction operation uses a subtracted value that depends on the presently measured current. The controller turns OFF the load driver, when the present calculation result of the add/subtract circuit exceeds a predetermined determination value.

BRIEF DESCRIPTION OF THE DRAWINGS

The above and other objectives features and advantages of the present invention will become more apparent from the following detailed description made with check to the accompanying drawings. In the drawings.

DETAILED DESCRIPTION OF THE PREFERRED EMBODIMENTS

Embodiments of the present invention are described below with reference to the drawings. Throughout the embodiments, the same symbols are given to the same or corresponding parts in the drawings.

First Embodiment

An overcurrent protection circuit 1 according to a first embodiment of the present invention is described below with reference to FIGS. 1 and 2. For example, the overcurrent protection circuit 1 can be mounted on a vehicle and serve as a power supply device for supplying power to a vehicle electrical load connected to a wire or a wire harness. Further, the overcurrent protection circuit 1 has functions to detect overcurrent flowing through the wire and to protect the load from the overcurrent.

Figure 1:
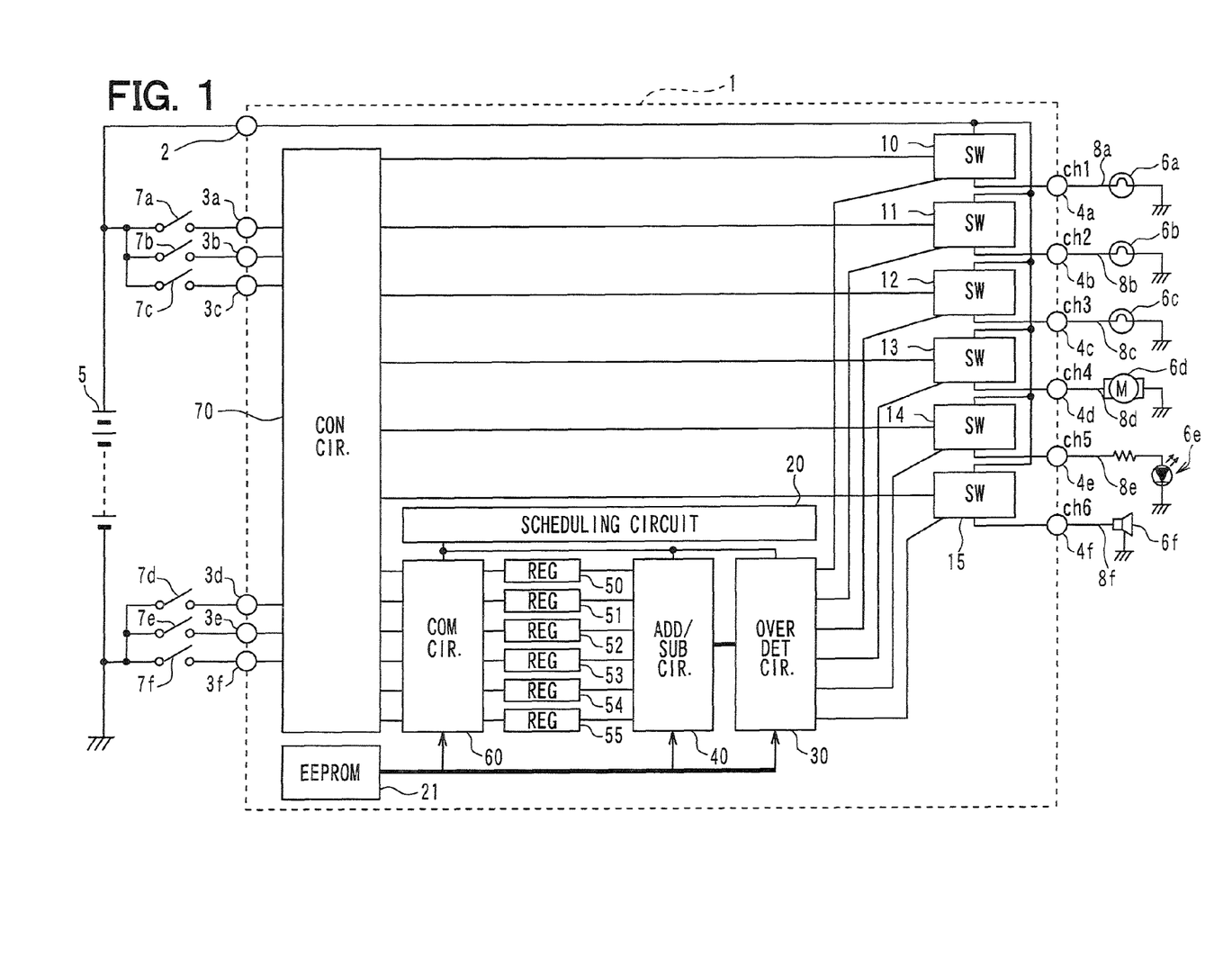
FIG. 1 is a circuit diagram illustrating an overall view of an overcurrent protection circuit according to a first embodiment of the present invention.

FIG. 1 is an overall view of the overcurrent protection circuit 1.

Figure 2:
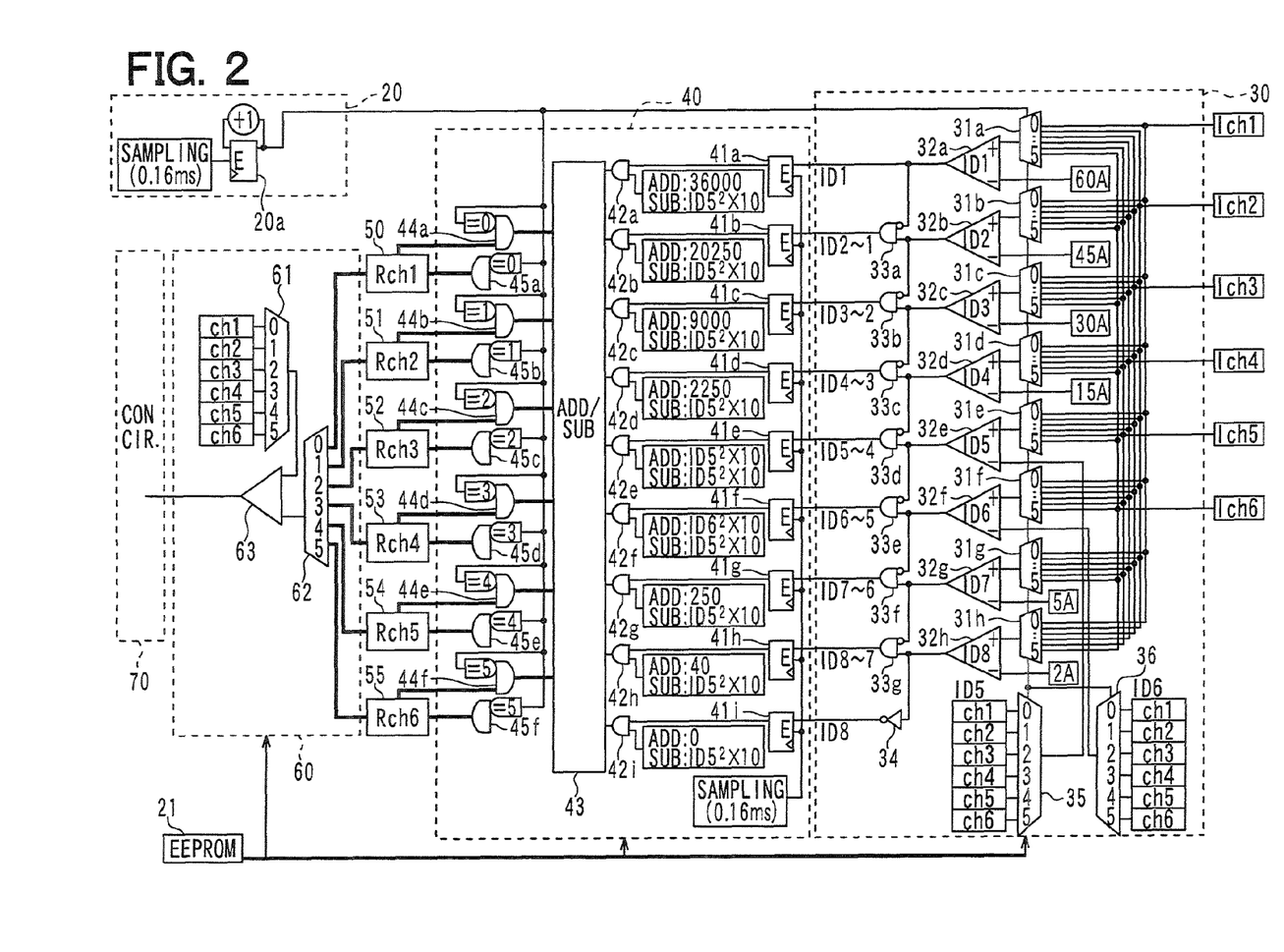
FIG. 2 is a circuit diagram illustrating a partial detailed view of the overcurrent protection circuit of FIG. 1.

FIG. 2 is a partial detailed view of FIG. 1. As shown in FIG. 1, the overcurrent protection circuit 1 includes semiconductor switches 10-15, a scheduling circuit 20, an electrically erasable programmable read-only memory (EEPROM) 21 an overcurrent detection circuit 30, an add/subtract circuit 40, registers 50-55, a comparing circuit 60, and a control circuit 70.

The overcurrent protection circuit 1 has a supply terminal 2, input terminals 3a-3f, and output terminals 4a-4f. The supply terminal 2 is connected to a power supply 5 so that the overcurrent protection circuit 1 can be supplied with power from the power supply 5. The power supplied to the overcurrent protection circuit 1 is supplied to loads 6a-6f through the output terminals 4a-4f, respectively.

A command signal for driving any of the loads 6a-6f is inputted to the control circuit 70 through the input terminals 3a-3f. As shown in FIG. 1, the input terminals 3a-3f are connected to switches 7a-7f, respectively. For example, when the switches 7a-7f are turned ON, the input terminals 3a-3c becomes a power supply potential and the input terminals 3d-3f becomes a ground potential.

The loads 6a-6f are connected to the output terminals 4a-4f through wires 8a-8f, respectively. Thus, the loads 6a-6f can be energized through the wires 8a-8f, respectively. Examples of the loads 6a-6f can include a lamp, a motor, a light emitting diode (LED), and a horn. It is noted that types (e.g., thickness and material) of the wires 8a-8f can be different depending on types of the loads 6a-6f.

It is noted that the output terminals 4a-4f of the overcurrent protection circuit 1 are hereinafter sometimes called the "channels ch1-ch6", respectively. According to the first embodiment, since the overcurrent protection circuit 1 has six output terminals 4a-4f, the overcurrent protection circuit 1 has six channels ch1-ch6.

The semiconductor switches 10-15 are switching devices and connected between the supply terminal 2 and the output terminals 4a-4f, respectively. Thus, the semiconductor switches 10-15 can serve as load drivers for driving the loads 6a-6f, respectively. Examples of the semiconductor switches 10-15 can include a power metal-oxide semiconductor field-effect transistor (MOSFET), an insulated gate bipolar transistor (IGBT), and a bipolar transistor. Assuming that the semiconductor switches 10-15 are N-channel MOSFETs, the drains of the semiconductor switches 10-15 are connected to the supply terminal 2, and the gates of the semiconductor switches 10-15 are connected to the control circuit 70. In this case, the sources of the semiconductor switches 10-15 are connected to the output terminals 4a-4f, respectively.

The scheduling circuit 20 performs time-sharing control that causes the loads 6a-6f to timeshare the overcurrent detection circuit 30, the add/subtract circuit 40, and the comparing circuit 60. Thus, the overcurrent detection circuit 30, the add/subtract circuit 40, and the comparing circuit 60 are shared among the channels ch1-ch6.

As shown in FIG. 2, the scheduling circuit 20 includes a flip-flop 20a and outputs a signal at a predetermined sampling period, for example 0.16 milliseconds (ms). In an example shown in FIG. 2, the scheduling circuit 20 generates the signal by adding a value of "1" to an output of the flip-flop 20a and outputs the signal at the sampling period of 0.16 ms. Since the overcurrent protection circuit 1 has six channels cha1-ch6, the signals having the value of "0", "1", . . . , and "5" are output sequentially at the sampling period of 0.16 ms. After the signal having the value of "5" is outputted, the flip-flop 20a is reset so that the scheduling circuit 20 can output the signal having the value of "0" at the next sampling period.

The signals having the value "0", "1" and "5" are used to select the channels ch1-ch6, respectively. For example, the signal having the value "0" is used to select the channel ch1 so that the channel ch1 can use the overcurrent detection circuit 30 the add/subtract circuit 40, and the comparing circuit 60. For another example, the signal having the value "1" is used to select the channel ch2 so that the channel ch2 can use the overcurrent detection circuit 30, the add/subtract circuit 40, and the comparing circuit 60. Therefore, the signal outputted from the flip-flop 20a (i.e., the scheduling circuit 20) at the sampling period is hereinafter called the "channel selection signal". According to the first embodiment, since the channel selection signal is outputted at the sampling period of 0.16 ms, switching from the channel ch1 through the channel ch6 is performed at a period of about 1 ms ($\approx$0.16 ms×6).

The EEPROM 21 is a memory device and stores various data including an overcurrent determination value, the types (e.g., thickness and material) of the wires 8a-8f, and the types of the loads 6a-6f. The EEPROM 21 outputs the stored data to the overcurrent detection circuit 30, the add/subtract circuit 40, and the comparing circuit 60.

The overcurrent detection circuit 30 measures load currents flowing through the loads 6a-6f. Specifically, the overcurrent detection circuit 30 is connected to the semiconductor switches 10-15 so that the load currents flowing through the loads 6a-6f can flow to the overcurrent detection circuit 30 through the semiconductor switches 10-15, respectively.

As shown in FIG. 2, the overcurrent detection circuit 30 includes selectors 31a-31h, comparators 32a-32h, AND gates 33a-33g, and an NOT gate (i.e., inverter) 34.

The load currents flowing through the semiconductor switches 10-15 are inputted to each of the selectors 31a-31h. Each of the selectors 31a-31h passes any one of the inputted currents in accordance with the channel selection signal received from the scheduling circuit 20. As mentioned previously, the scheduling circuit 20 sequentially outputs the channel selection signal at the sampling period. When receiving the channel selection signal, each of the selectors 31a-31h passes the load current flowing through the channel indicated by the channel selection signal. Outputs of the selectors 31a-31h are inputted to the comparators 32a-32h, respectively.

For example, when receiving the channel selection signal indicative of the channel ch1 from the scheduling circuit 20, each of the selectors 31a-31h passes a load current Ich1 flowing through the channel ch1 (i.e. flowing through the semiconductor switch 10) so that the load current Ich1 can be inputted to each of the comparators 32a-32h. Then, when receiving the channel selection signal indicative of the channel ch2 from the scheduling circuit 20, each of the selectors 31a-31h passes a load current Ich2 flowing through the channel ch2 so that the load current Ich2 can be inputted to each of the comparators 32a-32h. In this way, each of the selectors 31a-31h sequentially passes each of load currents Ich1-Ich6 at the sampling period.

The comparators 32a-32h have individual current thresholds ID1-ID8, respectively. The comparators 32a-32h compare the load currents Ich1-Ich6 inputted from the selectors 31a-31h with the thresholds ID1-ID8 respectively. It is noted that the current thresholds ID1-ID8 have the following relationship:

$$ID1<ID2<ID3<ID4<ID5<ID6<ID7<ID8$$

The current thresholds ID1-ID4, ID7, and ID8 of the comparators 32a-32d, 32g, and 32h are fixed values. According to the first embodiment, the current threshold ID1 of the comparator 32a is set to 60 amperes (A), the current threshold ID2 of the comparator 32b is set to 45 A, the current threshold ID3 of the comparator 32c is set to 30 A, the current threshold ID4 of the comparator 32d is set to 15 A, the current threshold ID7 of the comparator 32g is set to 5 A, and the current threshold ID8 of the comparator 32h is set to 2 A.

In contrast, the current thresholds 1D5 and 1D6 of the comparators 32e and 32f are variable within predetermined ranges. Specifically, as shown in FIG. 2, an inverting input terminal of the comparator 32e is connected to a selector 35, and the selector 35 outputs the threshold ID5 to the comparator 32e in accordance with the channel selection signal received from the scheduling circuit 20.

For example, the current threshold ID5 can vary between first through sixth values corresponding to the channels ch1-ch6, respectively. Assuming that the channel selection signal inputted to the selector 35 indicates the channel ch1, the selector 35 outputs the first value of the ID5 to the comparator 32e. In this way, the threshold ID5 of the comparator 32e can vary between the first through sixth values in accordance with which of the load currents Ich1-Ich6 is inputted to the overcurrent detection circuit 30. As mentioned previously, the types of the wires 8a-8f are different depending on the types of the loads 6a-6f. Therefore, the load currents Ich1-Ich6 flowing though the channels ch1-ch6 are different depending on the types of the wires 8a-8f. The threshold ID5 of the comparator 32e varies in accordance with the selected channel so that the load current flowing through the selected channel can be accurately detected.

Likewise, an inverting input terminal of the comparator 32f is connected to a selector 36, and the selector 36 outputs the threshold ID6 in accordance with the channel selection signal received from the scheduling circuit 20. For example, the current threshold 1D6 can vary between first through sixth values corresponding to the channels ch1-ch6, respectively. Assuming that the channel selection signal inputted to the selector 36 indicates the channel ch1 the selector 36 outputs the first value of the ID6 to the comparator 32f. In this way, the threshold ID6 of the comparator 32f can vary between the first through sixth values in accordance with which of the load currents Ich1-Ich6 is inputted to the overcurrent detection circuit 30.

An output of the comparator 32a is inputted to the add/subtract circuit 40 and inversely inputted to the AND gate 33a. An output of the comparator 32b is inputted to the AND gate 33a and inversely inputted to the AND gate 33b. Likewise, outputs of the comparators 32c-33f are inputted to the AND gates 33b-33f and inversely inputted to the AND gates 33c-33g, respectively. It is noted that an output of the comparator 32h is inputted to each of the AND gate 33g and the NOT gate 34.

Each of the AND gates 33a-33g is a logic circuit for performing AND operation on two inputs, one of which is inversely inputted from an upper comparator (in the case of FIG. 2) and the other of which is inputted from a lower comparator (in the case of FIG. 2). The NOT gate 34 is a logic circuit for producing an output opposite to the input.

For example, when the comparator 32d detects the current of 20 A, the output of the comparator 32d becomes high. In this case the output of the comparator 32c becomes low, because the current of 20 A is less than the threshold ID3 of the comparator 32c. As a result, the output of the AND gate 33b becomes low, the output of the AND gate 33c becomes high, and the output of the AND gate 33d becomes low. In this way, the comparators 32a-32h, the AND gates 33a-33g, and the NOT gate 34 are connected in such a manner that only the output of the comparator having the largest threshold less than the inputted current can be outputted from the overcurrent detection circuit 30.

Specifically, the fact that the output of the comparator 32a becomes high indicates that the current detected by the overcurrent detection circuit 30 is in a range of the threshold ID1 or more. The fact that the output of the AND gate 33a becomes high indicates that the current detected by the overcurrent detection circuit 30 is in a range of between the threshold ID1 and the threshold ID2. Likewise, the fact that the output of the AND gates 33b-33g become high indicate that the current detected by the overcurrent detection circuit 30 is in a range of between the thresholds ID2-ID7 and the thresholds ID3-ID8, respectively. It is noted that the fact that the output of the NOT gate 34 becomes high indicates that the current detected by the overcurrent detection circuit 30 is in a range of less than the threshold ID8.

The add/subtract circuit 40 performs addition operation using a predetermined added value and performs subtraction operation using a predetermined subtracted value. The added value and the subtracted value depend on the value of the current detected by the overcurrent detection circuit 30. The add/subtract circuit 40 performs the addition operation and the subtracted operation for each of the loads 6a-6f (i.e., channels ch1-ch6).

The add/subtract circuit 40 includes flip-flops 41a-41i, value selection circuits 42a-42i, an adder/subtractor 43, read circuits 44a-44f, and write circuits 45a-45f.

Each of the flip-flops 41a-41i outputs a high or low signal inputted to the flip-flops 41a-41i at a predetermined sampling period of, for example 0.16 ms. The flip-flop 41a holds the output of the comparator 32a. The flip-flops 41b-41h hold the outputs of the AND gates 33a-33g, respectively. The flip flop 41i holds the output of the NOT gate 34.

The value selection circuits 42a-42i output the added values and the subtracted values to the adder/subtractor 43 in accordance with the detected current ranges when receiving the high signals from the flip-flops 41a-41i respectively.

Figure 3:
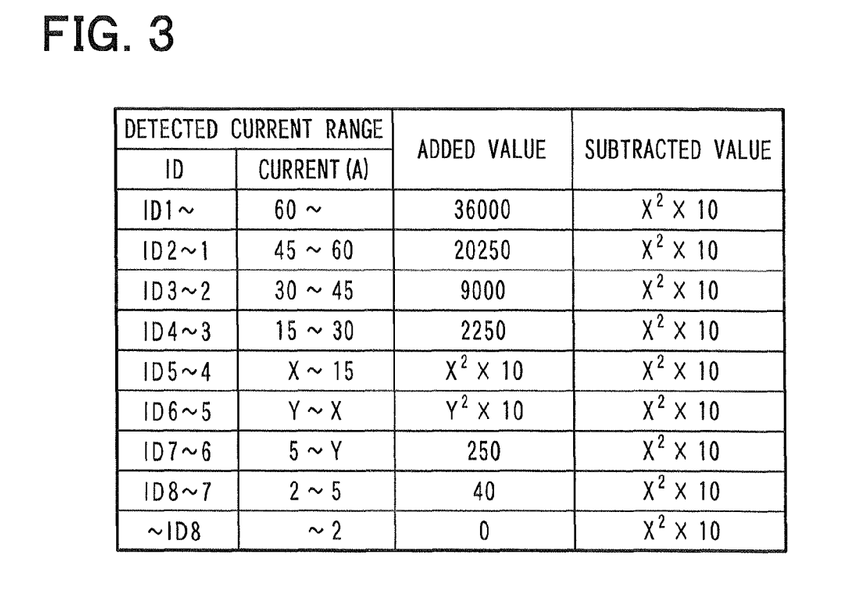
FIG. 3 is a diagram illustrating added values and subtracted values to be set in value selection circuits of, an add/subtract circuit of the overcurrent protection circuit.

FIG. 3 is a table illustrating the added values and the subtracted values set to the value selection circuits 42a-42i. In the table, the "X" represents the value of the ID5. The ID5(X) represents the maximum continuous current value of the wires 8a-8f. That is, the ID5(X) represents the maximum continuous current value of the loads 6a-6f. The "Y" represents the value of the ID6. As mentioned previously, the ID5 and the ID6 are variable values. For example, the ID5 can be 8 A, and ID6 can be 7.6 A that is 95 percent of the ID5.

As shown in FIG. 3, the added values and the subtracted values are set to the value selection circuits 42a-42i in accordance with the current detection ranges. For example, when the overcurrent detection circuit 30 detects the current in the range of between the threshold ID3 and the threshold ID2, the flip-flop 41c outputs a high signal to the value selection circuit 42c at the sampling period so that the value selection circuit 42c can output the added value of "9000" and the subtracted value of "ID5$^2$×10" to the adder/subtractor 43.

It is noted that the added value is proportional to the square of the detected current value. That is, the added value is proportional to the Joule heat. The subtracted value is proportional to the square of the maximum continuous current value of the wires 8a-8f. That is, the subtracted value is a heat dissipation value that depends on the wires 8a-8f. The added value and the subtracted value are predetermined and stored in the EEPROM 21. As can be seen from FIG. 3, the subtracted value is multiplied by 10 so that the first decimal place of the squire of the threshold ID5 can be fixed. In such an approach digital processing can be facilitated.

A calculation operation performed by the adder/subtractor 43 is described in detail below. The adder/subtractor 43 performs both an addition operation and a subtraction operation on a previous calculation result so as to produce a present calculation result. The addition operation uses the added value that depends on the current that is presently detected by the overcurrent detection circuit 30. The subtraction operation uses the subtracted value that depends on the current that is presently detected by the overcurrent detection circuit 30. The adder/subtractor 43 performs the calculation operations for the channels ch1-ch6 to produce the present calculation results. The present calculation results for the channels ch1-ch6 are stored in the registers 50-55, respectively, and used as the previous calculation results in the next calculation operations. Specifically, the adder/subtractor 43 reads the previous calculation results from the registers 50-55 by using the read circuits 44a-44f, respectively. Then, the adder/subtractor 43 performs the addition operation and the subtraction operation on the previous calculation results to produce the present calculation results and stores the present calculation results in the registers 50-55 by using, the write circuits 45a-45f, respectively.

That is, the present calculation result for each channel can be given as follows: "Previous calculation result +added value −subtracted value". The added value and the subtracted value are predetermined as shown in FIG. 3. For example, when the presently detected current is in the range of less than the ID8 the adder/subtractor 43 produces the present calculation result by adding the added value of "0" to the previous calculation result and by subtracting the subtracted value of "ID5$^2$×10" from the previous calculation result.

The channel selection signal is input from the scheduling circuit 20 to the read circuits 44a-44f and the write circuits 45a-45f. The read circuit indicated by the channel selection signal reads the previous calculation value from the corresponding register, and the write circuit indicated by the channel selection signal writes the present calculation value into the corresponding register. In this way, the add/subtract circuit 40 sequentially performs the calculation operation for the channels ch1-ch6 at the sampling period.

It is noted that the add/subtract circuit 40 continues the calculation operation even after the semiconductor switches 10-15 are turned OFF by the control circuit 70. Specifically, when the semiconductor switches 10-15 are turned OFF, the current detected by the overcurrent detection circuit 30 becomes less than the threshold ID8. Therefore, as shown in FIG. 3, the add/subtract circuit 40 produces the present calculation result by adding the added value of "0" to the previous calculation result and by subtracting the subtracted value of "ID5$^2$×10" from the previous calculation result. That is, the add/subtract circuit 40 performs only a subtraction operation for subtracting the subtracted value of "ID5$^2$×10" from the previous calculation result. In this way, after the semiconductor switches 10-15 are turned OFF, the add/subtract circuit 40 continues the subtraction operation.

Figure 4:
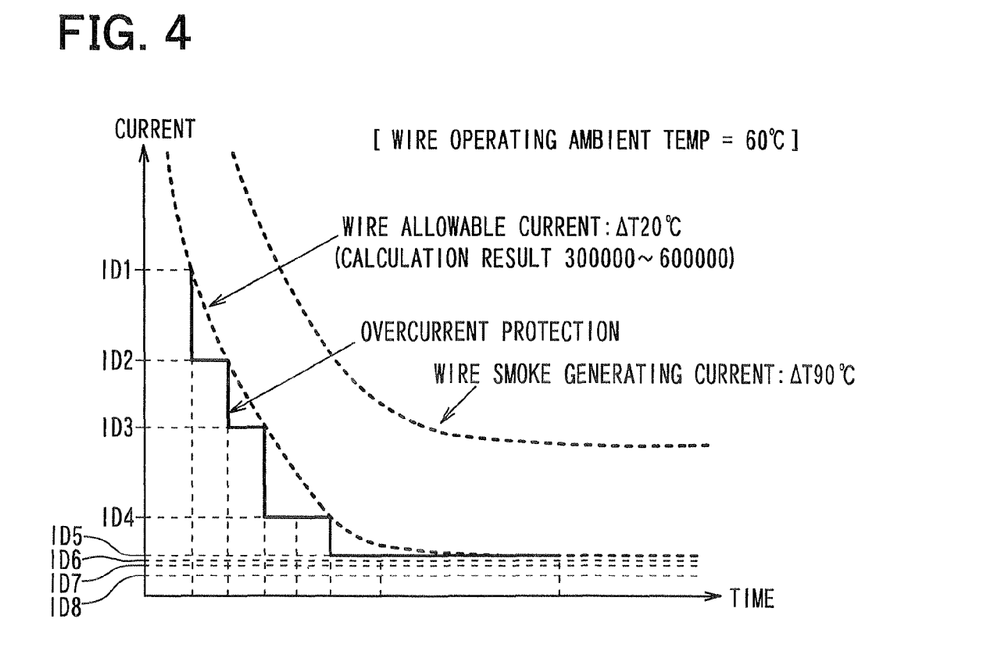
FIG. 4 is a diagram illustrating an overcurrent protection characteristic exhibited by the overcurrent protection circuit.

FIG. 4 shows an overcurrent protection characteristic obtained by the add/subtract circuit 40. In FIG. 4, the horizontal axis represents time, and the vertical axis represents current. The overcurrent protection characteristic drawn in FIG. 4 is based on the assumption that the maximum operating ambient temperature of the wires 8a-8f is 60° C. (degrees) and that the wires 8a-8f are AVS wires or AVSS wires according to Japanese Automotive Standards Organization (JASO). The AVS wires or AVSS wires have the maximum allowable temperature of 80° C. and the smoke generating temperature of 150° C. Therefore, in the case of the ambient temperature of 60° C., a wire allowable current characteristic can be determined such that a wire temperature rise ΔT is 20° C., and a wire smoke generating current characteristic can be determined such that a wire temperature rise ΔT is 90° C. Specifically, the wire allowable current characteristic corresponds to the calculation result of between 300000 and 600000 (depending on the wire thickness). As described later, the calculation result of between 300000 and 600000 is used as a determination threshold so that the overcurrent protection characteristic can follow the wire allowable current characteristic.

According to the first embodiment, the overcurrent detection circuit 30 has eight comparators 32a-32h. Therefore, as shown in FIG. 4, the overcurrent protection characteristic is represented by a stepwise graph. When current detection resolution is increased by increasing the number of comparators in the overcurrent detection circuit 30 or by using an A/D converter, the overcurrent protection characteristic can approach the wire allowable current characteristic, which is represented by a curved graph. The wire allowable current characteristic corresponds to a heat capacity characteristic to be interrupted and varies depending on the wire type such as the thickness and material.

According to the first embodiment, the overcurrent protection circuit 1 is configured such that the overcurrent protection characteristic follows the wire allowable current characteristic. Alternatively, the overcurrent protection circuit 1 can be configured such that the overcurrent protection characteristic follows the wire smoke generating current characteristic. Alternatively, the overcurrent protection circuit 1 can be configured such that the overcurrent protection characteristic follows a characteristic between the wire allowable current characteristic and the wire smoke generating current characteristic.

The calculation results of the add/subtract circuit 40 for the loads 6a-6f (i.e. channels ch1-ch6) are stored in the registers 50-55, respectively. While the add/subtract circuit 40 performs the calculation operation for one of the loads 6a-6f, the calculation results for the others of the loads 6a-6f remain stored in the corresponding resistors 50-55. Thus, the add/subtract circuit 40 can sequentially perform the calculation operation for the loads 6a-6f. That is, the add/subtract circuit 40 is shared between the loads 6a-6f.

To determine whether an overcurrent condition occurs in the channels ch1-ch6, the comparing circuit 60 compares first determination thresholds with the calculation results of the add/subtract circuit 40 for the channels ch1-ch6, respectively. The comparing circuit 60 includes two selectors 61 and 62 and a comparator 63.

The selector 61 outputs the first determination threshold to the comparator 63 in accordance with the channel selection signal received from the scheduling circuit 20. The first determination threshold is different depending on the channels ch1-ch6. The first determination threshold is stored in the EEPROM 21. The selector 62 outputs the calculation result stored in the registers 50-55 to the comparator 63 in accordance with the channel selection signal received from the scheduling circuit 20.

The comparator 63 compares the first determination threshold inputted from the selector 61 with the calculation result inputted from the selector 62. If the calculation result is greater than the first determination threshold the comparator 63 determines that the overcurrent condition occurs in the corresponding channel and outputs a high signal to the control circuit 70. In this way, the selectors 61 and 62 output the first determination threshold and the calculation result corresponding to the channel indicated by the channel-selection signal received from the scheduling circuit 20. Thus, the comparator 63 sequentially compares the first determination threshold with the calculation result for the channels ch1-ch6.

As shown in FIG. 1, the control circuit 70 turns ON and OFF the semiconductor switches 10-15 in accordance with an input condition. The input condition includes ON/OFF states of the switches 7a-7f and the level of the signal received from the comparing circuit 60. For example, when the high signal is inputted to the control circuit 70 from the comparing circuit 60 due to the fact that the calculation result of the add/subtract circuit 40 exceeds the first determination threshold, the control circuit 70 turns OFF the semiconductor switches 10-15 to protect the wires 8a-8f from the overcurrent condition.

It is noted that the control circuit 70 has a second determination threshold less than the first determination threshold. When the calculation result of the add/subtract circuit 40 decreases to the second threshold, the control circuit 70 turns ON the semiconductor switches 10-15. Thus, when the overcurrent condition in the wires 8a-8f disappears, the loads 6a-6f are reactivated. In this way, even when the semiconductor switches 10-15 are turned OFF to deactivate the loads 6a-6f, the semiconductor switches 10-15 are turned ON after a certain period of time so that the loads 6a-6f can be reactivated.

In the example shown in FIG. 2, the comparison between the first determination threshold and the calculation result of the add/subtract circuit 40 is performed by the comparator 63. Likewise, the comparison between the second determination threshold and the calculation result of the add/subtract circuit 40 is performed by a comparator (not shown). These are the overall configuration of the overcurrent protection circuit 1.

Figure 5:
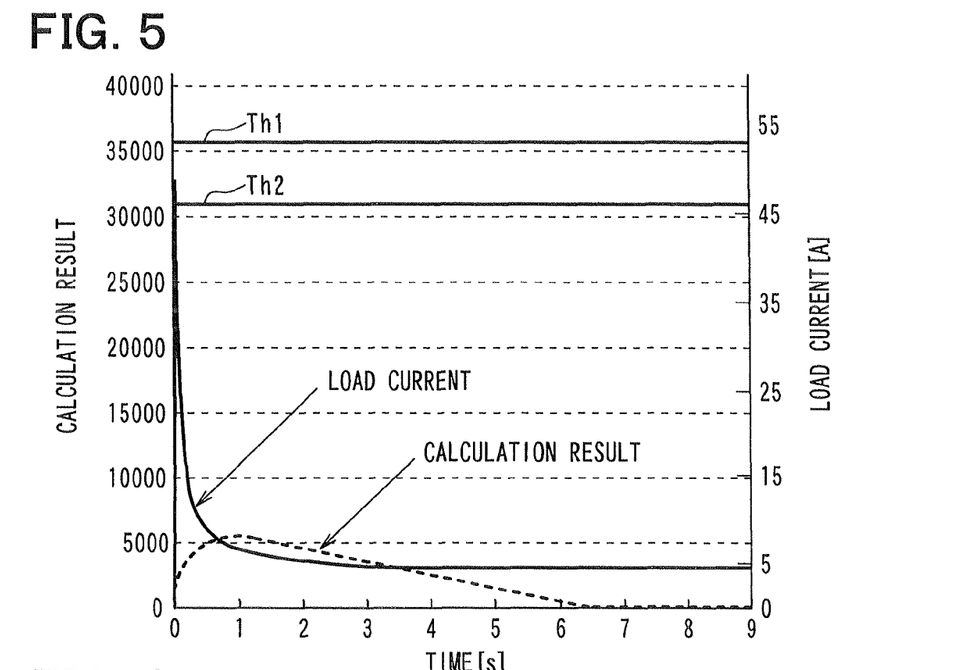
FIG. 5 is a diagram illustrating a calculation result of the add/subtract circuit produced when a normal load current flows through a headlamp as a load.
Figure 6:
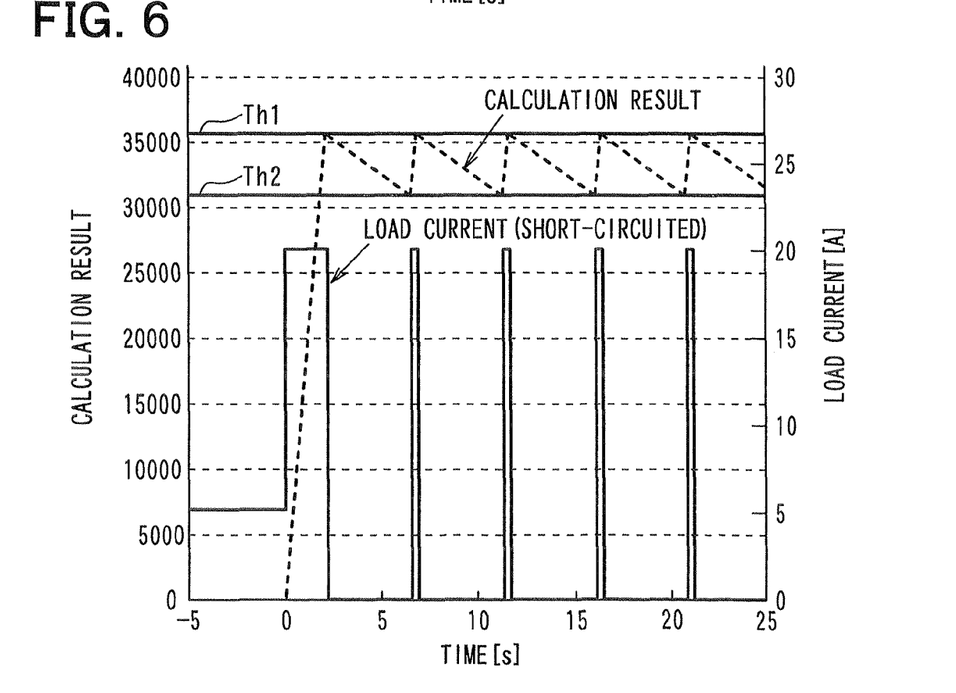
FIG. 6 is a diagram illustrating the calculation result of the add/subtract circuit produced when a short-circuited load current flows through the headlamp.

Next, an operation of the overcurrent protection circuit 1 are described below with reference to FIGS. 5 and 6. FIG. 5 shows the calculation result of the add/subtract circuit 40 when a normal load current flows through a headlamp which is one of the loads 6a-6f. FIG. 6 shows the calculation result of the add/subtract circuit 40 when a short-circuited load current (i.e., overcurrent) flows through the headlamp.

In FIGS. 5 and 6, the horizontal axis represents time, and the vertical axis represents the load current and the calculation result. In FIGS. 5 and 6, Th1 represents the first determination threshold and Th2 represents the second determination threshold. FIGS. 5 and 6 show the load current flowing through the headlamp that is one of the loads 6a-6f. That is, FIGS. 5 and 6 show the load current flowing through one of the channels ch1-ch6.

In response to the load current flowing through one channel (i.e., headlamp) the overcurrent protection circuit 1 works as follows. As mentioned previously, the channels ch1-ch6 are switched by the scheduling circuit 20 at the sampling period. The overcurrent protection circuit 1 works in the same manner in response to the load currents flowing through the channels ch1-ch6.

When the switches 7a-7f are operated so that the control circuit 70 can turn ON one of the semiconductor switches 10-15 to activate the headlamp an inrush current flows as shown in FIG. 5. Then the overcurrent detection circuit 30 detects the inrush current and outputs a detection result corresponding to the detected inrush current to the add/subtract circuit 40. Then the add/subtract circuit 40 performs the calculation operation by adding the added value corresponding to the detected inrush current to the previous calculation result and by subtracting the subtracted value corresponding to the detected inrush current from the previous calculation result.

Assuming that the previous calculation result stored in the corresponding register is zero, the add/subtract circuit 40 adds the added value to zero and subtracts the subtracted value from zero. In short, the add/subtract circuit 40 subtracts the subtracted value from the added value.

It is noted that the previous calculation result stored in the corresponding register is not always zero depending on a situation before the switches 7a-7f are operated.

As can be seen from FIG. 5, although the inrush current becomes very large instantaneously when the corresponding semiconductor switch is turned ON, the inrush current decreases sharply. Accordingly, the current detected by the overcurrent detection circuit 30 decreases sharply with time.

The added value and the subtracted value become small with the decrease in the current detected by the overcurrent detection circuit As shown in FIG. 5, the calculation result of the add/subtract circuit 40 increases during the flow of the inrush current. Then, when the current becomes stable after the flow of the inrush current, the calculation result of the add/subtract circuit 40 gradually decreases. Then, when a certain period of time is lapsed, the subtracted value exceeds the added value. Therefore, the present calculation result of the add/subtract circuit 40 becomes smaller than the previous calculation result stored in the corresponding register so that the present calculation result can eventually become zero.

When such a normal load current as shown in FIG. 5 flows, the calculation result of the add/subtract circuit 40 does not exceed the first determination threshold (Th1). Therefore, since the comparing circuit 60 does not determine that the overcurrent condition occurs in the corresponding channel, the control circuit 70 does not turn OFF the corresponding semiconductor switch.

In contrast, when the overcurrent condition occurs in the corresponding channel, the overcurrent flows intermittently over a long period of time as shown in FIG. 6. Therefore the calculation result of the add/subtract circuit 40 continues to increase and eventually exceeds the first determination threshold (Th1). Then, the control circuit 70 turns OFF the corresponding semiconductor switch.

As a result, the load current flowing through the corresponding channel becomes zero. The overcurrent detection circuit 30 detects the current of zero and the add/subtract circuit 40 performs the calculation operation by adding the added value corresponding to the detected current of zero to the previous calculation result and by subtracting the subtracted value corresponding to the detected current of zero from the previous calculation result. As can be seen from FIG. 3, the subtracted value is greater than the added value, when the detected current is zero (i.e., less than the threshold ID8). Therefore, the add/subtract circuit 40 performs only the subtraction operation to subtract the subtracted value from the previous calculation value. Therefore the present calculation result of the add/subtract circuit 40 decreases as long as the load current is zero.

Then, when the calculation result decreases to the second determination threshold (Th2), the control circuit 70 turns ON the corresponding semiconductor switch so that the load current can restart to flow through the corresponding channel. If the restarted load current is overcurrent, the calculation result of the add/subtract circuit 40 exceeds the first determination value so that the corresponding semiconductor switch can be turned OFF.

Then, the calculation result of the add/subtract circuit 40 decreases to the second determination threshold so that the corresponding semiconductor switch can be turned ON. Then, the overcurrent flows through the corresponding channel, and the calculation result of the add/subtract circuit 40 exceeds the first determination value so that the corresponding semiconductor switch can be turned OFF. These actions are repeated until the overcurrent condition in the corresponding channel is resolved.

As described above, according to the first embodiment the semiconductor switches 1045 are turned ON, when the calculation result of the add/subtract circuit 40 decreases to the second determination threshold from the first determination threshold. This action is hereinafter called the "retry action". Alternatively, the semiconductor switches 10-15 can remain turned OFF, even when the calculation result of the add/subtract circuit 40 decreases to the second determination threshold from the first determination threshold. This action is hereinafter called the "latch action". The EEPROM 21 can store data for selecting whether the retry action or the latch action is performed.

In this way, the overcurrent protection circuit 1 detects the overcurrent condition in the channels ch1-ch 6 and protects the wires 8a-8f and the loads 6a-6f. The above operation explained by referring to FIGS. 5 and 6 is performed for the channels ch1-ch6 at the sampling period.

Advantages of the first embodiment are summarized below.

As described above according to the first embodiment, the calculation operation, in which the added value corresponding to the detected current is added to the previous calculation result and the subtracted value corresponding to the detected current is subtracted from the previous calculation result, is repeated. Then, the comparison operation in which the present calculation result with the first determination threshold is compared, is performed to detect the overcurrent condition. Since the calculation operation and the comparison operation are simple, the overcurrent protection circuit 1 can be simplified in configuration.

In particular, according to the first embodiment, the added value is predetermined to be proportional to the square of the detected current, and the subtracted value is predetermined to be a heat dissipation value of the wire 8a-8f. Therefore, an analog or digital conversion circuit for squaring the detected current is not needed, and a complicated circuit for calculating the value of heat dissipated from the wires 8a-8 when the current flows through the wires 8a-8f is not needed Therefore, the overcurrent protection circuit 1 can be simplified in configuration.

Further, according to the first embodiment, the overcurrent condition is determined sequentially for multiple channels ch1-ch6 at the sampling period by using the scheduling circuit 20. Thus, the overcurrent detection circuit 30 and the add/subtract circuit 40 are shared between multiple loads 6a-6f so that the overcurrent protection circuit 1 can be simplified in configuration.

Further according to the first embodiment, whether the retry action or the latch action is performed can be selected for the channels ch1-ch6. For example, the retry action can be applied to the channel where the overcurrent condition may be caused by a factor, such as locking of a motor of a frozen wiper, other than short-circuited. Thus the overcurrent protection circuit 1 can be used for various types of loads.

Each of the semiconductor switches 10-15 can serve as a Toad driver in claims. The overcurrent detection circuit 30 can serve as a current sensor in claims. The first determination threshold can serve as a predetermined first determination value in claims and the second determination threshold can serve as a predetermined second determination value in claims.

The comparing circuit 60 and the control circuit 70 can work in conjunction with each other to serve as a controller in claims. The add/subtract circuit 40 and the registers 50-55 can work in conjunction with each other to serve as an add/subtract circuit in claims.

Second Embodiment

A second embodiment of the present invention is described below with reference to FIG. 7. A difference between the first and second embodiments is summarized as follows.

The first embodiment is characterized in that the add/subtract circuit 40 performs both the addition operation (including addition of zero) and the subtraction operation on the previous calculation result so as to produce the present calculation result. In contrast, the second embodiment is characterized in that the add/subtract circuit 40 performs the addition operation or the subtraction operation on the previous calculation result so as to produce the present calculation result. Specifically, according to the second embodiment, the addition operation is performed when the presently measured current is greater than a predetermined current value, and the subtraction operation is performed when the presently measured current is less than the predetermined current value.

Figure 7:
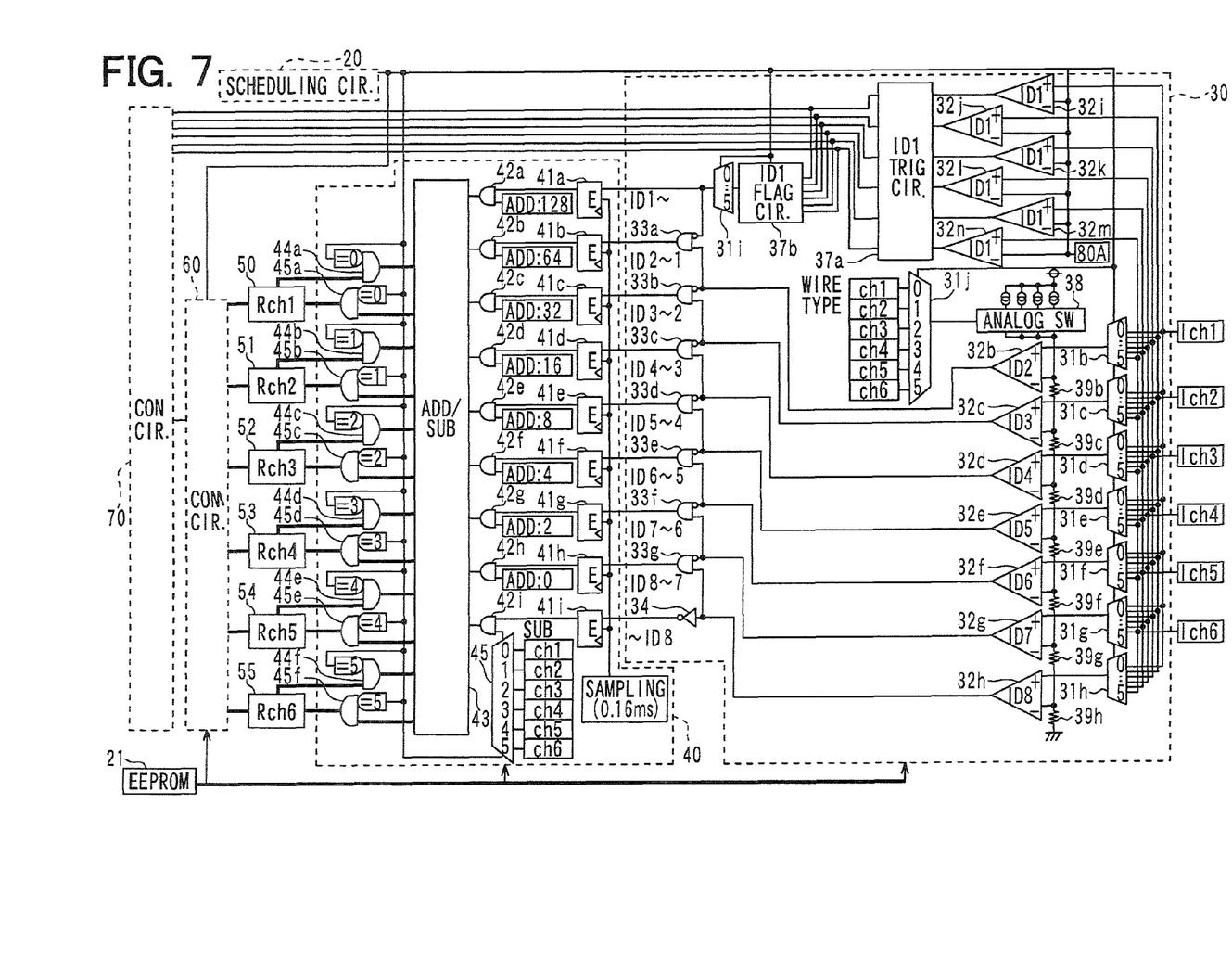
FIG. 7 is a circuit diagram illustrating a partial detailed view of an overcurrent protection circuit according to a second embodiment of the present invention.

FIG. 7 corresponds to FIG. 2 and illustrates a partial circuit diagram of an overcurrent protection circuit according to the second embodiment. The difference between the first and second embodiments is described in detail with reference to FIG. 7.

Like the first embodiment, the overcurrent detection circuit 30 includes the selectors 31b-31h, the comparators 32b-32h, the AND gates 33a-33g, and the NOT gate 34. Further, the overcurrent detection circuit 30 includes selectors 31i and 31j, comparators 32i-32n, an ID1-detection triggered circuit 37a an ID1-detection flag circuit 37b, and an analog switch 38.

The current Ich1 flowing through the channel ch1 is inputted to a non-inverting input terminal of the comparator 32i. The current Ich2 flowing through the channel ch2 is inputted to a non-inverting input terminal of the comparator 32j. The current Ich2 flowing through the channel ch2 is inputted to a non-inverting input terminal of the comparator 32j. The current Ich3 flowing through the channel ch3 is inputted to a non-inverting input terminal of the comparator 32k. The current Ich4 flowing through the channel ch4 is inputted to a non-inverting input terminal of the comparator 32l. The current Ich5 flowing through the channel ch5 is inputted to a non-inverting input terminal of the comparator 32m. The current Ich6 flowing through the channel ch6 is inputted to a non-inverting input terminal of the comparator 32n. A predetermined current threshold ID1 (e.g., 80 A) is inputted to inverting input terminals of the comparators 32i-32n. Thus, the comparators 32i-32n compare the currents Ich1-Ich6 with the current threshold ID1, respectively. The comparison results of the comparators 32i-32n are inputted to the ID1-detection triggered circuit 37a.

As described later with reference to FIG. 8, the threshold ID1 is a maximum allowable current value of the semiconductor switches 10-15.

The ID1-detection triggered circuit 37a outputs the comparison results of the comparators 32i-32n to the control circuit 70. The ID1-detection flag circuit 37b is flagged in accordance with a command from the control circuit 70. For example, when the ID1-detection flag circuit 37b is flagged, the ID1-detection flag circuit 37b outputs a high signal. In contrast, when the ID1-detection flag circuit 37b is not flagged, the ID1-detection flag circuit 37b outputs a low signal. The output signal of the ID1-detection flag circuit 37b is inputted to the flip-flop 41a of the add/subtract circuit 40 through the selector 31i in accordance with the channel selection signal received from the scheduling circuit 20.

Further, a series circuit of resistors 39b-39h is connected between the analog switch 38 and a ground potential. A connection point between the analog switch 38 and the resistor 39b is connected to the inverting input terminal of the comparator 32b. Likewise, connection points between the resistors 39b-39h are connected to the inverting input terminals of the comparators 32c-32h respectively.

The selector 31j is connected to the analog switch 38 and outputs a wire type signal to the analog switch 38 in accordance to the channel selection signal received from the scheduling circuit 20. The wire type signal is different depending on the types of the wires 8a-8f connected to the channels ch1-ch6 indicated by the channel selection signal. The analog switch 38 is turned ON and OFF in accordance with the wire type signal so that the value of an electric current flowing through the series circuit of the resistors 39b-39h can change depending on the type of the wire connected to the selected channel. Thus, the current thresholds ID2-ID8 of the comparator 32b-32h can change depending on the type of the wire connected to the selected channel.

For example, the wires 8a-8f can be AVSS wires or AVSSF wire. For example, the thicknesses of the wires 8a-8f can be 0.5 sq, 0.75 sq, 0.85 sq or 1.25 sq. That is, the wires 8a-8f can have individual characteristics. Therefore, the current thresholds ID2-ID8 of the comparators 32b-32h are adjusted in accordance with the types of the wires 8a-8f.

Figure 8:
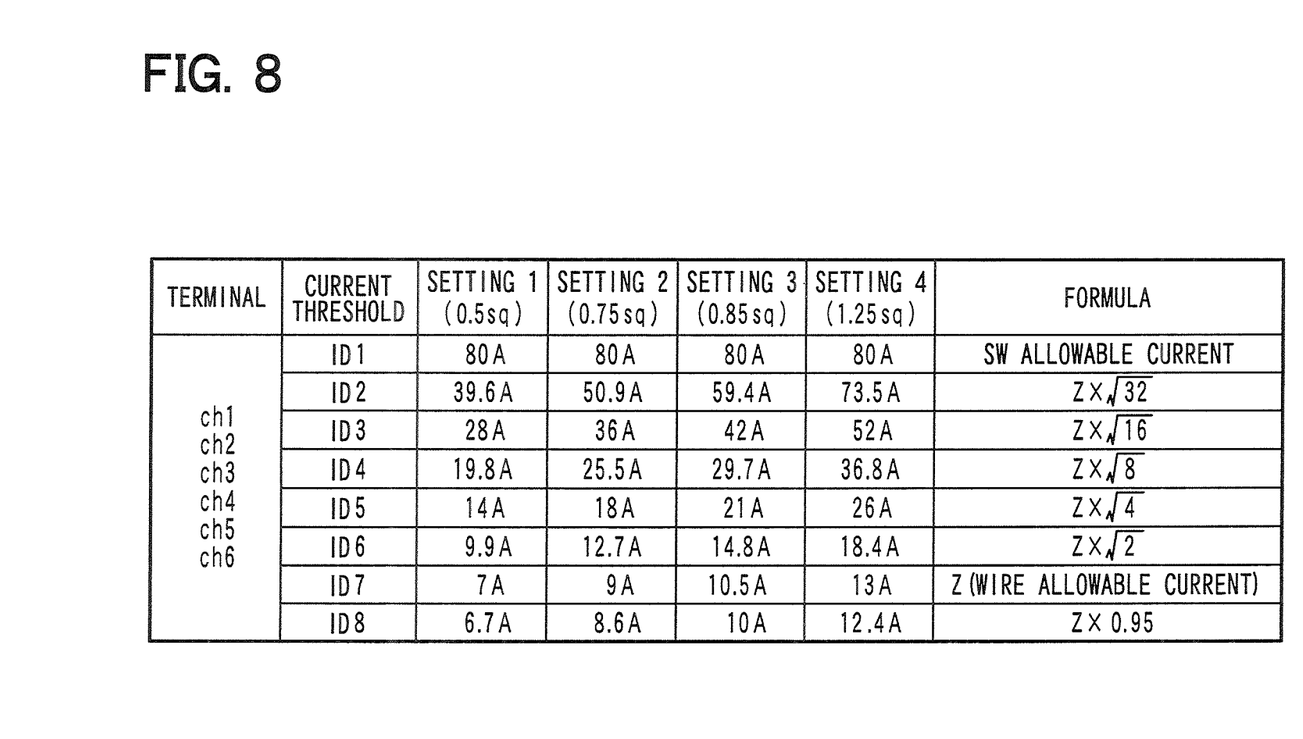
FIG. 8 is a diagram illustrating current threshold settings according to the second embodiment.

FIG. 8 is a diagram illustrating an example of the current thresholds ID1-ID8 when the wires 8a-8f are made of copper. As can be seen from FIG. 8, the threshold ID1 of each of the comparators 32i-32n is fixed to the maximum allowable current value (80 A) of the semiconductor switches 10-15, regardless of the types (i.e., thicknesses) of the wires 8a-8f. In contrast, the current thresholds ID2-ID8 of the comparators 32b-32h are adjusted in accordance with the thicknesses of the wires 8a-8f by using different settings 1-4 in accordance with the thicknesses of the wires 8a-8f. The current thresholds ID2-ID8 are calculated in accordance with predetermined formulas shown in the right column of FIG. 8. In an example shown in FIG. 8, the current threshold ID7 is a wire allowable current value Z of the wires 8a-8f, and the current thresholds ID2-ID6 and ID8 are calculated by multiplying the wire allowable current value Z by predetermined weighting factors.

Further, according to the second embodiment, the value selection circuits 42a-42h have individual predetermined added values. The value selection circuits 42a-42h output the added values to the adder/subtractor 43 when receiving high signals from the flip-flops 41a-41h, respectively. In contrast, the value selection circuit 42i outputs a predetermined subtracted value to the adder/subtractor 43 when receiving a high signal from the flip-flop 41i. The selector 45 sets the subtracted value to the value selection circuit 42i in accordance with the channel selection signal received from the scheduling circuit 20. That is, the subtracted value can be different depending on the channels ch1-ch6.

According to the second embodiment, when the current presently measured by the overcurrent detection circuit 30 is greater than a predetermined current value, the add/subtract circuit 40 performs the addition operation on the previous calculation result by using the added value depending on the presently measured current, thereby producing the present calculation result. In contrast, when the current presently measured, by the overcurrent detection circuit 30 is less than the predetermined current value, the add/subtract circuit 40 performs the subtraction operation on the previous calculation result by using the subtracted value depending on the presently measured current, thereby producing the present calculation result. For example, the predetermined current value can be the maximum allowable current value of the wires 8a-8f or the smoke generating current value of the wires 8a-8f.

Figure 9:
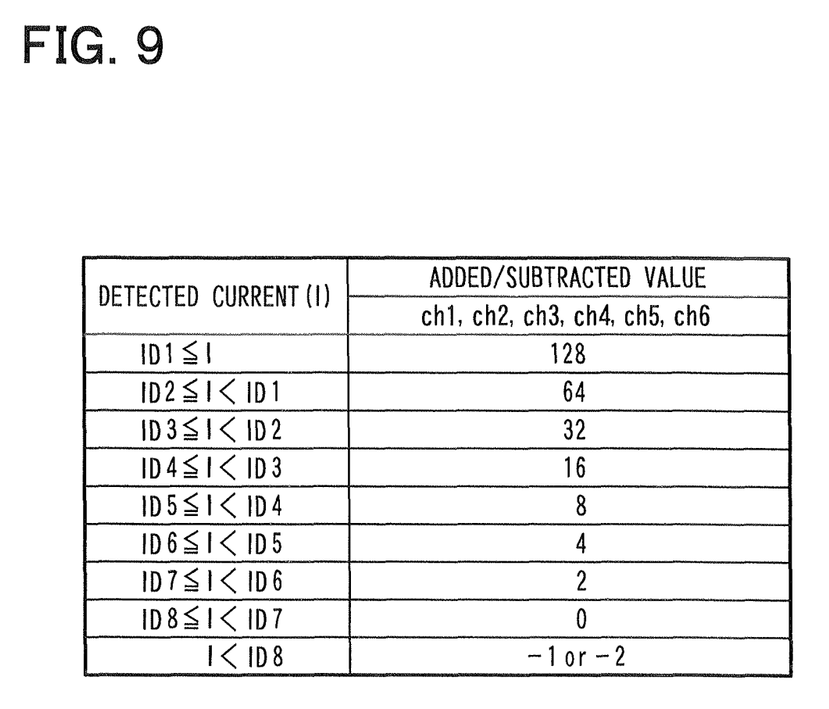
FIG. 9 is a diagram illustrating added values and subtracted values to be set in value selection circuits of an add/subtract circuit according to the second embodiment.

For example, as shown in FIG. 9, when a current value I that is presently measured by the overcurrent detection circuit 30 is in the range of the threshold ID1 or more, the added value of "128" is set to the add/subtract circuit 40. When the current value I is in the range of between the threshold ID1 and the threshold ID2 the added value of "64" is set to the add/subtract circuit 40.

Likewise, when the current value I is in the range of between the threshold ID2 and the threshold ID3, the added value of "32" is set to the add/subtract circuit 40. When the current value I is in the range of between the threshold ID3 and the threshold ID4, the added value of "16" is set to the add/subtract circuit 40. When the current value I is in the range of between the threshold ID4 and the threshold ID5, the added value of "8" is set to the add/subtract circuit 40. When the current value I is in the range of between the threshold ID5 and the threshold ID6, the added value of "4" is set to the add/subtract circuit 40. When the current value I is in the range of between the threshold ID6 and the threshold ID7, the added value of "2" is set to the add/subtract circuit 40.

Further, when the current value I is in the range of between the threshold ID7 and the threshold ID8 the added value of "0" is set to the add/subtract circuit 40.

The added value is common between the channels ch1-ch6.

As described above, the value selection circuit 42a-42h, which are used when the current value I measured by the overcurrent detection circuit 30 is the threshold ID8 or more, has only the added value (including the addition of zero). Therefore, when the presently measured current value I is greater than the wire allowable current value Z, the add/subtract circuit 40 adds the added value to the previous calculation result. That is, when the presently measured current is greater than the predetermined current value the add/subtract circuit 40 performs only the addition operation on the previous calculation result by using the added value depending on the presently measured current.

In the above description, the added value has a value of "128", when the measured current is in the range of the threshold ID1 or more. It is noted that this is merely one example. The added value can have a value other than "128", when the measured current is in the range of the threshold ID1 or more. For example, the added value can have a value of "13", when the measured current is in the range of the threshold ID1 or more. The added value of "13" is determined as follows. Assuming that the turn OFF speed of semiconductor switches 10-15 is 100 μs when the measured current is in the range of the threshold ID1 or more, since the current detection for the six channels ch1-ch6 is performed at the period of 1 ms (≈6×0.16 ms), the added value becomes 13(≈128× (100 μs/1 ms)).

In contrast, the value selection circuit 42i, which is used when the current value I measured by the overcurrent detection circuit 30 is in the range of less than the threshold ID8, has only the subtracted value depending on the types of the wires 8a-8f. Therefore, when the presently measured current value I is less than the wire allowable current value Z, the add/subtract circuit 40 subtracts the subtracted value from the previous calculation result. That is, when the presently measured current is less than the predetermined current value, the add/subtract circuit 40 performs only the subtraction operation on the previous calculation result by using the subtracted value depending on the presently measured current.

According to the second embodiment, as shown in FIG. 9, the subtracted value of "1" or "2" is selected depending on the channels ch1-ch6 Data for determining that which of the subtracted value of "1" and "2" is applied to which of the channels ch1-ch6 is stored in the EEPROM 21 and read out from the EEPROM 21 when the overcurrent protection circuit works. It is noted that the subtracted value is expressed as a minus value in FIG. 9.

Other configurations (e.g., the scheduling circuit 20 and the comparing circuit 60) are the same between the first and second embodiments. Therefore, the overcurrent protection circuit according to the second embodiment works in almost the same manner as the overcurrent protection circuit according to the first embodiment.

As described above the second embodiment is characterized in that the addition operation or the subtraction operation on the previous calculation result is performed depending on whether the current measured by the overcurrent detection circuit 30 is greater or less than the predetermined current value such as the wire allowable current value z.

Further, according to the second embodiment, the overcurrent detection circuit 30 includes the ID1-detection flag circuit 37$b$.

In normal conditions where the current exceeding the threshold ID1 does not flow in the channels, the ID1-detection flag circuit 37$b$ is not flagged. In this case, like the first embodiment, the calculation result of the add/subtract circuit 40 is sequentially compared with the determination threshold by the comparing circuit 60 for the channels ch1-ch6.

Then, when the comparing circuit 60 determines that the current flowing in one channel exceeds the threshold ID1, the control circuit 70 causes the ID1-detection flag circuit 37$b$ to be flagged so that the semiconductor switch corresponding to the channel can be turned OFF.

Advantages of the second embodiment are summarized below. Firstly, according to the second embodiment, the semiconductor switches 10-15 can be surely protected from an excessive current (i.e., overcurrent) exceeding the threshold ID1, which is the maximum allowable current value of the semiconductor switches 10-15.

Specifically, as shown in FIG. 7, the comparators 32$i$-32$n$ are connected to the respective channels ch1-ch6 so as to detect the excessive current exceeding the maximum allowable current value (e.g., 80 A) of the semiconductor switches 10-15. The comparators 32$i$-32$n$ are disconnected from the selectors 31$b$-31$h$ so that the currents flowing through the channels ch1-ch6 can directly flow to the respective comparators 32$i$-32$n$. In such an approach, the excessive currents flowing through the wires 8$a$-8$f$ can be always detected regardless of the sampling period of the scheduling circuit 20.

When the comparators 32$i$-32$n$ detect the excessive current of 80 A or more, the control circuit 70 immediately turns OFF the corresponding semiconductor switch through which the excessive current flows. For example, assuming that the comparator 32$i$ detects the excessive current of 80 A or more, the control circuit 70 immediately turns OFF the semiconductor switch 10. For example, the semiconductor switches 10-15 can be turned OFF within 100 μs after the flow of the excessive current. Thus, the semiconductor switches 10-15 can be surely protected from the excessive current.

In the above example, when the measured current is in the range of the threshold ID1 or more, the corresponding semiconductor switch is turned OFF within about 100 μs. The scheduling circuit 20 performs the overcurrent detection for the six channels ch1-ch6 at the period of 1 ms (≈16×0.1.6 ms). Therefore, it is impossible to detect an overcurrent that flows during a time period where the overcurrent detection of the scheduling circuit 20 is not performed. According to the second embodiment if an overcurrent flows during a time period where the overcurrent detection of the scheduling circuit 20, the ID1-detection flag circuit 37$b$ is flagged. In such an approach, the added value of "128" can be set to the add/subtract circuit 40 at the sampling period immediately after the flow of the overcurrent.

As described above when the overcurrent exceeding the maximum allowable current of the semiconductor switches 10-15 flows in the channels ch1 ch6, the corresponding semiconductor switches 10-15 are turned OFF immediately. Thus, the semiconductor switches 10-15 can be surely protected from the overcurrent.

Secondly, according to the second embodiment, the current thresholds ID2-ID8 of the comparators 32$b$-32$h$ are adjusted by using the analog switch 38. As described above, since the types (e.g., thicknesses) of the wires 8$a$-8$f$ are different, there is a need to set the current thresholds ID2-ID8 in accordance with the types of the wires 8$a$-8$f$. In the first embodiment, the thresholds ID2-ID4, 1D7, and ID5 are the same between the channels ch1 ch6, but the thresholds ID5 and ID6 are adjusted by using the selectors 35 and 36 in accordance with the types of the wires 8$a$-8$f$. Therefore, since the thresholds 1D5 and ID6 for each wire are needed to be stored in the EEPROM 21, the amount of data stored in the EEPROM 21 becomes large.

In contrast, in the second embodiment, the thresholds ID2-ID8 of the comparators 32$b$-32$h$ are determined by the resistance ratio of the resistors 39$b$-39$h$, and the thresholds ID2-ID8 are adjusted in accordance with the types of the wires 8$a$-8$f$ by operating the analog switch 38 so that the value of the current flowing through the resistors 39$b$-39$h$ can change. In particular, the thresholds ID2-ID7 continuously increase by a factor of the square root of 2 (i.e., $\sqrt{2}$) with respect to the threshold ID7, which is the maximum wire allowable current value Z. That is, the resistances of the resistors 39$b$-39$h$ are set so that the thresholds ID2-ID7 can continuously increase by a factor of $\sqrt{2}$.

For example, in the case of the first setting 1 corresponding to the wire thickness of 0.5 sq since the maximum wire allowable current value Z (i.e., ID7) is 7 A, the threshold ID6 becomes 9.9 A (=$\sqrt{2}$×7), and the threshold ID5 becomes 14 A (=$\sqrt{2}$×$\sqrt{2}$×7). For another example, in the case of the fourth setting 4 corresponding to the wire thickness of 1.25 sq, since the maximum wire allowable current value Z is 13 A, the threshold ID6 becomes 18.4 A (=$\sqrt{2}$×13) and the threshold 1D5 becomes 26 A (=$\sqrt{2}$×$\sqrt{2}$×13).

In this way, the thresholds ID2-ID8 of the comparators 32$b$-32$h$ can be changed in accordance with the types of the wires 8$a$-8$f$ by adjusting the current flowing through the resistors 39$b$-39$h$ by using the analog switch 38. Therefore, unlike the first embodiment there is no need to store the thresholds ID 2-ID8 in the EEPROM 21. As long as the types of the wires 8$a$-8$f$ are stored in the EEPROM 21, the thresholds ID2-ID8 of the comparators 32$b$-32$h$ can be changed in accordance with the types of the wires 8$a$-8$f$ by using the analog switch 38 and the selector 31$j$. Therefore, the amount of data stored in the EEPROM 21 can be reduced compared to that of the first embodiment.

Further, since the thresholds ID2-ID8 of the comparators 32$b$-32$h$ can be changed in accordance with the types of the wires 8$a$-8$f$ by using the analog switch 38, there is no need to change the added values and the subtracted values in accordance with the thresholds ID2-ID8.

Specifically, in the first embodiment, as shown in FIG. 3, the added values and the subtracted values are set in accordance with the thresholds ID1-ID8 and stored in the EEPROM 21. For example, 16 digits are required to represent the added value of "36000" in binary. Therefore a large amount of data is stored in the EEPROM 21

In contrast, in the second embodiment as can be seen from the formulas shown in FIG. 8, the thresholds ID2-ID7 continuously increase by a factor of the square root of 2 (i.e., $\sqrt{2}$) with respect to the threshold ID7. The added value is proportional to the square of the detected current (i.e. current threshold). Thus, as shown in FIG. 9, the added value is doubled (2, 4, 8, . . . , 128) as the detected current increases.

Since the formula for determining the current threshold is common between the wires 8a-8f, the added value is common between the wires 8a-8f. As shown in FIG. 9, the maximum added value is "128", which can be represented by 8-digit binary numbers. Therefore, the amount of data stored in the EEPROM 21 can be reduced as compared to that of the first embodiment. Thus, the circuit size can be reduced.

As described above, according to the second embodiment, the magnitude and number of the current threshold, the added value, and the subtracted value can be reduced. Therefore, the amount of required data is reduced so that the circuit size can be reduced.

(Modifications)

The embodiments described above can be modified in various ways. For example, the overcurrent protection circuit 1 can have more than six channels. The calculation operation performed by the add/subtract circuit 40 can be implemented as software by using a microcomputer. Alternatively, the calculation operation performed by the add/subtract circuit 40 can be implemented as hardware by using a digital circuit.

In the embodiments, the overcurrent protection circuit is configured such that the overcurrent protection characteristic follows the wire allowable current characteristic. Alternatively, the overcurrent protection circuit can be configured such that the overcurrent protection characteristic follows the wire smoke generating current characteristic by adjusting the determination threshold, the add value, the subtracted value, and/or the current thresholds for example, by using the EEPROM 21.

In the embodiments, the addition operation and the subtraction operation on the previous calculation result are repeated to sequentially produce the present calculation result. Alternatively, only the subtraction operation on the previous calculation result can be repeated to sequentially produce the present calculation result. Alternatively, the addition operation or the subtraction operation on the previous calculation result can be repeated to sequentially produce the present calculation result.

The current thresholds of the comparators 32a-32h can continuously increase by a predetermined factor. The variable current threshold of the comparator (e.g., 32e, 32f) can be less than the allowable continuous current value of the load (6a-6f).

Such changes and modifications are to be understood as being within the scope of the present invention as defined by the appended claims.

What is claimed is:

1. An overcurrent protection circuit comprising:

a load driver configured to drive a load;

a controller configured to turn ON and OFF the load driver in accordance with an input condition;

a current sensor configured to measure a load current flowing through the load; and an add/subtract circuit configured to perform an addition operation on a previous calculation result or a subtraction operation on the previous calculation result so as to produce a present calculation result, the addition operation using a predetermined added value that depends on the presently measured current, the subtraction operation using a predetermined subtracted value that depends on the presently measured current, wherein the add/subtract circuit performs the addition operation when the presently measured current is greater than a predetermined current value, the add/subtract circuit performs the subtract operation when the presently measured current is less than the predetermined current value, and the controller turns OFF the load driver, when the present calculation result of the add/subtract circuit exceeds a predetermined first determination value.

2. The overcurrent protection circuit according to claim 1, wherein the load driver is coupled to the load through a wire, and the predetermined current value is an allowable current value of the wire or a smoke-generating current value of the wire.

3. An overcurrent protection circuit comprising:

a load driver configured to drive a load;

a controller configured to turn ON and OFF the load driver in accordance with an input condition a current sensor configured to measure a load current flowing through the load; and an add/subtract circuit configured to perform both an addition operation and a subtraction operation on a previous calculation result or perform only the subtraction operation on the previous calculation result so as to produce a present calculation result, the addition operation using a predetermined added value that depends on the presently measured current, the subtraction operation using a predetermined subtracted value that depends on the presently measured current, wherein the controller turns OFF the load driver, when the present calculation result of the add/subtract circuit exceeds a predetermined first determination value.

4. The overcurrent protection circuit according to claim 3, wherein the add/subtract circuit performs only the subtraction operation after the load driver is turned OFF, and the controller turns ON the load driver, when the present calculation result of the add/subtract circuit decreases to a predetermined second determination value less than the first determination value.

5. The overcurrent protection circuit according to claim 3, wherein the added value is predetermined to be proportional to the square of the presently measured current.

6. The overcurrent protection circuit according to claim 3, wherein the load driver is coupled to the load through a wire, and the subtracted value is predetermined to be a heat dissipation value of the wire.

7. The overcurrent protection circuit according to claim 3, wherein the add/subtract circuit produces the present calculation result at a predetermined sampling period.

8. The overcurrent protection circuit according to claim 3, wherein the add/subtract circuit is implemented as software using microcomputer.

9. The overcurrent protection circuit according to claim 3, wherein the add/subtract circuit is implemented as hardware using a digital circuit.

10. The overcurrent protection circuit according to claim 3, wherein
the current sensor includes a plurality of comparators having individual current thresholds.

11. The overcurrent protection circuit according to claim 10, wherein
the current thresholds of the comparators continuously increase by a predetermined factor.

12. The overcurrent protection circuit according to claim 10, wherein
at least one of the current thresholds is variable within a predetermined range.

13. The overcurrent protection circuit according to claim 12, wherein
the at least one of the current thresholds is an allowable continuous current value of the load.

14. The overcurrent protection circuit according to claim 12, wherein
the at least one of the current thresholds is less than an allowable continuous current value of the load.

15. The overcurrent protection circuit according to claim 3, further comprising:
a scheduling circuit, wherein
the load comprises a plurality of loads
the current sensor measures the electric current of each load
the add/subtract circuit produces the present calculation result for each load, and
the scheduling circuit causes the plurality of loads to time-share the current sensor and the add/subtract circuit.

16. The overcurrent protection circuit according to claim 15, wherein
the add/subtract circuit has a plurality of memories, and
the present calculation result for each load is stored in a corresponding memory as the previous calculation result.

* * * * *